(12) United States Patent
Yuan

(10) Patent No.: US 7,229,580 B2
(45) Date of Patent: *Jun. 12, 2007

(54) PREPARATION OF POROUS POLY(ARYL ETHER) ARTICLES AND USE THEREOF

(75) Inventor: Youxin Yuan, Syracuse, NY (US)

(73) Assignee: PoroGen Corporation, Medford, MA (US)

( * ) Notice: Subject to any disclaimer, the term of this patent is extended or adjusted under 35 U.S.C. 154(b) by 434 days.

This patent is subject to a terminal disclaimer.

(21) Appl. No.: 10/836,049

(22) Filed: Apr. 30, 2004

(65) Prior Publication Data

US 2004/0222148 A1    Nov. 11, 2004

Related U.S. Application Data

(60) Provisional application No. 60/467,987, filed on May 5, 2003.

(51) Int. Cl.
*B01D 71/06* (2006.01)
*B01D 71/00* (2006.01)

(52) U.S. Cl. .................. 264/49; 264/514; 264/561; 264/562; 264/567; 264/346; 210/500.22; 210/500.23; 210/500.27; 210/500.39; 528/310; 528/64

(58) Field of Classification Search ............ None
See application file for complete search history.

(56) References Cited

U.S. PATENT DOCUMENTS

| | | | |
|---|---|---|---|
| 3,852,388 A | 12/1974 | Kimura | 264/41 |
| 4,944,775 A | 7/1990 | Hayes | 55/16 |
| 4,970,034 A | 11/1990 | Ly et al. | 264/46.4 |
| 5,886,059 A | 3/1999 | Wang | 521/64 |
| 5,906,742 A | 5/1999 | Wang et al. | 210/500.41 |
| 5,958,989 A | 9/1999 | Wang et al. | 521/64 |
| 6,218,441 B1 | 4/2001 | Meluch et al. | 521/80 |
| 6,513,666 B2 | 2/2003 | Meyering et al. | 210/490 |
| 6,887,408 B2 * | 5/2005 | Yuan | 264/49 |

FOREIGN PATENT DOCUMENTS

WO    WO 01/89672    11/2001

OTHER PUBLICATIONS

Yong Ding et al., "Novel Macro and Meso Porous Materials Prepared from Miscible Polysulfone/Polyimide Blends", Mat. Res. Soc. Symp. Proc. vol. 752 c 2003 Materials Research Society, pp. 8-15.
J. Smid et al., "The formation of symmetric hollow fiber membranes for gas separation, using PPE of different intrinsic viscosities", (1991) pp. 121-127.
S. Berghmans et al., "Spinning of hollow porous fibers via the TIPS mechanism," (1996) pp. 171-189 Published by Elsevier Science B.V.

* cited by examiner

*Primary Examiner*—Krishnan S. Menon
(74) *Attorney, Agent, or Firm*—St. Onge Steward Johnston & Reens LLC

(57) ABSTRACT

The preparation and use of novel porous poly(aryl ether) articles is disclosed. The porous articles are prepared from blends of poly(aryl ether) polymers with polyimides by selectively decomposing the polyimide phase. The preferred reagents used to decompose the polyimide phase include monoethanolamine and tetramethylammonium hydroxide. The porous articles can be configured as a single layer or as a multilayer article. The porous articles of the present invention are unique that at least one of the layers exhibits a narrow pore size distribution. The articles of the present invention can be used as a porous media for a broad range of applications, including porous membranes for fluid separations, such as microfiltration, ultrafiltration, and gas separation, as a battery separators, and as a sorption media.

43 Claims, 4 Drawing Sheets

PREPARATION OF POROUS POLY(ARYL ETHER) ARTICLES AND USE THEREOF

CROSS-REFERENCE TO RELATED APPLICATIONS

This application claims the benefit of, under 35 U.S.C. §119(e), U.S. Provisional Patent Application No. 60/467,987, filed May 5, 2003.

FIELD OF THE INVENTION

The present invention relates to the process for the preparation of porous poly(aryl ether) articles and the method of use thereof. More particularly, the present invention relates to the preparation of single layer or multilayer porous poly(aryl ether) articles which are formed from blends of poly(aryl ether)s with polyimides by chemically decomposing and removing the polyimide phase. The porous poly(aryl ether) materials are unique in that at least one of the layers exhibits a uniform pore size distribution. The porous materials of the present invention can be used as porous articles for a broad range of applications, including membranes for fluid separations, such as microfiltration, ultrafiltration, nanofiltration, and gas separation, as battery separators, and as a sorption media.

BACKGROUND OF THE INVENTION

Microporous polymeric poly(aryl ether) membranes that include polysulfone and polyphenylene oxide membranes are well known in the art and are used widely for filtration and purification processes, such as filtration of waste water, preparation of ultrapure water and in medical, pharmaceutical or food applications, including removal of microorganisms, dialyses and protein filtration. The polysulfone membranes are manufactured from a number of polysulfone type polymers, including bisphenol A based polysulfone, biphenyl based polysulfone and polyether sulfone. While these membranes have found broad utility for a variety of purposes, they suffer from several disadvantages, such as a broad and frequently non uniform pore size distribution, and susceptibility to fouling. The microporous membrane materials are frequently divided into two categories based on pore size: microporous and mesoporous. Microporous materials typically contain pores with diameter greater than 50 nm, while mesoporous materials are usually defined as those with pore diameter in the range of 2–50 nm. It is particularly difficult to prepare mesoporous poly(aryl ether) membranes.

Preparation of porous poly(aryl ether) membranes is well known in the art. Phase inversion method has been used extensively for the preparation of such membranes. The membranes thus obtained are frequently asymmetric with graded pore size across the cross section. Such membranes are frequently mechanically weak and the amount of open pore space on the surface of the membrane as a fraction of the available surface area is relatively small, as disclosed for example, by Kools, W., in WO Patent 0189672 A1; 2001.

U.S. Pat. Nos. 3,852,388 and 4,944,775 disclose preparation of asymmetric poly(phenylene oxide) membranes. The process involves forming a solution of the poly(phenylene oxide) in a solvent system, forming a nascent membrane from the solution, followed by coagulating the nascent membrane in a coagulation bath formed from a liquid that is miscible with the solvent system but is a non-solvent for the poly(phenylene oxide) polymer. Preparation of porous poly(phenylene oxide) hollow fiber membranes is described by S. Berghams et al. in the article entitled "Spinning of hollow porous fiber via the TIPS mechanism", Journal of Membrane Sciene, Volume 116, page 171–184, 1996, and by J. Smid et al. in the article entitled "The formation of asymmetric hollow fiber membranes for gas separation, using PPE of different intrinsic viscosities", Journal of Membrane Science, Volume 64, page 121–128, 1991. The porous hollow fibers are produced by a solution based spinning process wherein the nascent hollow fibers are solidified by a thermally induced quenching or by a coagulation in a non-solvent.

Preparation of highly asymmetric, anisotropic polysulfone membranes is disclosed in U.S. Pat. Nos. 5,886,059 and 5,958,989. Also known is the preparation of polysulfone membranes with a mixed isotropic and anisotropic structure as disclosed, for example, in U.S. Pat. No. 5,906,742, and preparation of isotropic polysulfone membranes as described by A. L. Ly et al. in U.S. Pat. No. 4,970,034.

It is also known to produce porous poly(aryl ether) membranes, including porous polysulfone membranes by a melt extrusion process. For example, T. B. Meluch et al. in U.S. Pat. No. 6,218,441 disclose preparation of polysulfone semipermeable membranes from polysulfone mixture with a solvent, and a non-solvent by a melt extrusion process.

It is also known to produce multilayer porous membranes or porous membranes comprised of multiple porous zones. Preparation of reinforced, three zone microporous membranes is, for example, disclosed by M. T. Meyering et al. in U.S. Pat. No. 6,513,666. Such multizone porous membranes are known to provide improved mechanical properties, particularly in fluid separation applications that require periodic backwashing, are known to exhibit a lower cross membrane pressure drop, a decreased susceptibility to breach of the membrane separation layer and a decreased propensity of fouling.

A recent report by Y. Ding and B. Bikson entitled "Novel macro and meso porous materials prepared from polysulfone/polyimide blends" in "Material Research Society Symposium Proceeding", Volume 752, AA1.3, Boston, 2002, describes preparation of porous polysulfone films from its blends with a phenylindane containing polyimide by decomposing the phenylindane containing polyimide with a hydrazine solution in methanol. However, the use of hydrazine based chemical system is hazardous and complex. Thus, there still remains a need in the art to produce poly(aryl ether) porous articles, including porous membranes, with improved properties by a simple and commercially benign method that does not utilize hazardous chemicals in membrane fabrication.

SUMMARY OF THE INVENTION

An objective of the present invention is to provide a microporous or a mesoporous poly(aryl ether) article with a uniform pore size distribution.

Another objective of the present invention is to provide an improved method for the preparation of the microporous or mesoporous poly(aryl ether) articles.

A further objective of the present invention is to provide a multilayer or an asymmetric porous poly(aryl ether) article that exhibits a distinct and different pore structure between the layers and wherein at least one of the layers exhibits a uniform pore size distribution.

Still another objective of the present invention is to provide a porous poly(aryl ether) article to be used as a fluid separation membrane.

An even further objective of the present invention is to provide a porous poly(aryl ether) article to be used as an adsorption media, or as a catalyst support.

These and other objectives of this invention have been met by a process for the preparation of a porous poly(aryl ether) article comprising:

a. forming a blend of poly(aryl ether) polymer with a polyimide;
b. forming a shaped article from said poly(aryl ether)/polyimide blend by extrusion, casting or molding;
c. decomposing the polyimide phase in the shaped article into low molecular weight fragments by reacting the polyimide with a primary amine, a secondary amine, or a tetramethylammonium hydroxide; and
d. removing the low molecular weight fragments from the article.

In some embodiments steps c) and d) can be combined. The porous article can be further dried under conditions that substantially preserve the porous structure.

According to another embodiment of the present invention, the above objectives and other objectives that are apparent to those skilled in the art are achieved by the process for the preparation of a porous poly(aryl ether) article comprising:

a. forming a casting solution containing a poly(aryl ether), a polyimide and at least one solvent,
b. forming a shaped configuration in the form of a flat sheet, a tube or a hollow fiber from said casting solution,
c. conveying said shaped configuration through an evaporation zone,
d. contacting said shaped configuration with a coagulation or quenching fluid to solidify the shaped configuration,
e. decomposing polyimide in said shaped configuration into low molecular weight fragments by chemical means,
f. removing said low molecular weight fragments from said shaped configuration to form the porous poly(aryl ther) article.

The porous poly(aryl ether) article can be further dried under conditions that substantially preserve the porous structure.

In some embodiments of this invention, the step d) is omitted and the solvent is completely or partially removed in step c). Further more, it is also within the scope of this invention to combine steps d) and e) or steps e) and f) into a single step.

According to a further embodiment of the present invention, the above objectives and other objectives that are apparent to those skilled in the art are achieved by the process of preparing a poly(aryl ether) article with multiple porous zones by the process comprising:

a. forming a first blend of poly(aryl ether) polymer with a polyimide;
b. forming at least one additional blend of a poly(aryl ether) polymer with a polyimide wherein composition of this blend differs from that of the first blend;
c. forming a shaped article of two or more layers from the poly(aryl ether)/polyimide blends by extrusion, solution casting or molding;
d. decomposing the polyimide in the shaped article into low molecular weight fragments by chemical means; and
e. removing the low molecular weight fragments from the article.

The present invention is now described in detail with reference to the accompanying figures.

DETAILED DESCRIPTION OF AN EMBODIMENT OF THE INVENTION

Figure 1:
FIG. 1 is a Scanning Electron Microscopy photomicrograph of the cross-section of the two layered porous polysulfone article of the present invention at a magnification of 3,000×.
Figure 2:
FIG. 2 is a Scanning Electron Microscopy photomicrograph of the top surface of the two layered porous polysulfone article of FIG. 1 at a magnification of 5,000×. The top layer is formed from the polysulfone/polyimide blend 50/50 by weight.
Figure 3:
FIG. 3 is a Scanning Electron Microscopy photomicrograph of the bottom surface of the two layered porous polysulfone article shown in FIG. 1 at a magnification of 10,000×. The bottom layer is formed from the polysulfone/polyimide blend 30/70 by weight.
Figure 4:
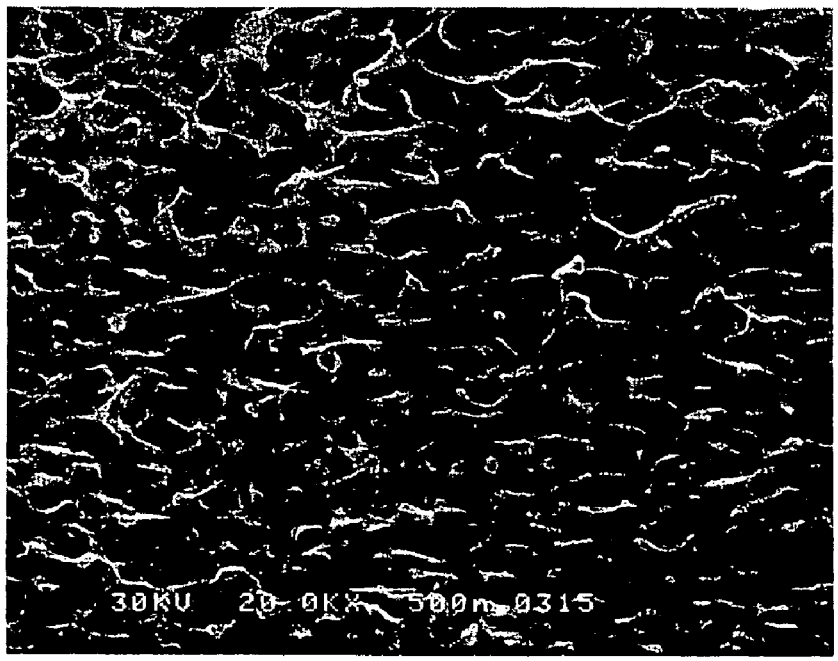
FIG. 4 is a Scanning Electron Microscopy photomicrograph of the cross-section of the top layer of a two layered porous polysulfone article of present invention shown in FIG. 1 at a magnification of 20,000×.
Figure 5:
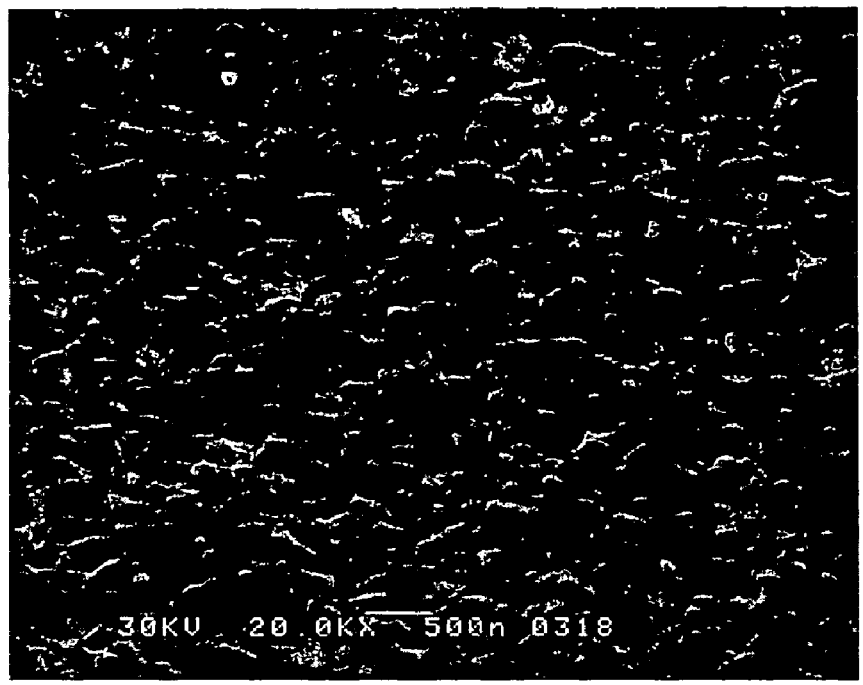
FIG. 5 is a Scanning Electron Microscopy photomicrograph of the cross-section of the second, bottom layer of a two layered porous polysulfone article of present invention shown in FIG. 1 at a magnification of 20,000×.

The porous articles of this invention are comprised of poly(aryl ether)s. These articles are prepared from a blend of the poly(aryl ether) type polymer with a compatible polyimide. First a precursor article is formed from the poly(aryl ether)/polyimide blend by extrusion, solution casting or molding followed by a selective chemical decomposition and removal of the polyimide phase to form the final porous article.

The porous article is comprised of a poly(aryl ether) or a blend of poly(aryl ether)s of the following general formula:

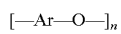

wherein Ar is an aromatic moiety, which may contain a sulfone functional group which is a part of the polymer backbone, and wherein n is an integer from 20 to 500. The poly(ary ether)s of this invention may include polysulfones, such as polyether sulfone, Ultrason®, manufactured by the Bayer Corporation, and bisphenol A based polysulfone, Udel®, manufactured by the Solvay Advanced Polymers, LLC, and biphenyl based polysulfone, Radel®, manufactured by the Solvay Advanced Polymers, LLC, and poly (phenylene oxide) polymers such as PPO®, manufactured by the General Electric Corporation.

Preferably, the poly(aryl ether) is selected from the polymers comprised of the following repeat units:

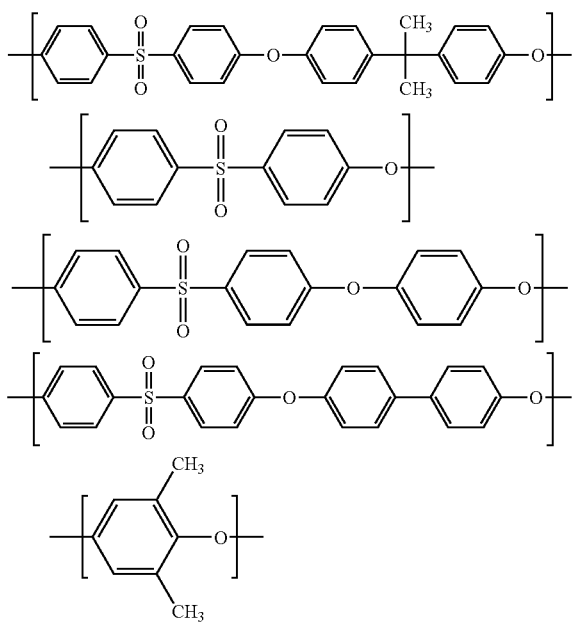

The polyimides that form the compatible precursor blend with the poly(aryl ether) type polymers are defined as polymers containing

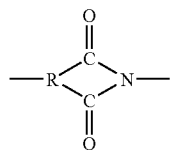

inkages and include aliphatic and aromatic polyimides, copolyimides and polyimide block and graft copolymers, wherein the polyimide is defined as a molecule that contains at least two imide linkages. Additional polyimides of the present invention include aromatic polyamide imides, polyhydrazine imides and polyester imides.

Aromatic polyimides are particularly useful for the preparation of porous articles of this invention. The preferred aromatic polyimides are described by the following general formula:

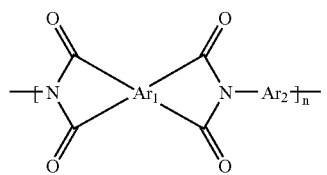

where n is an integer from 2 to 500, and where

is independently

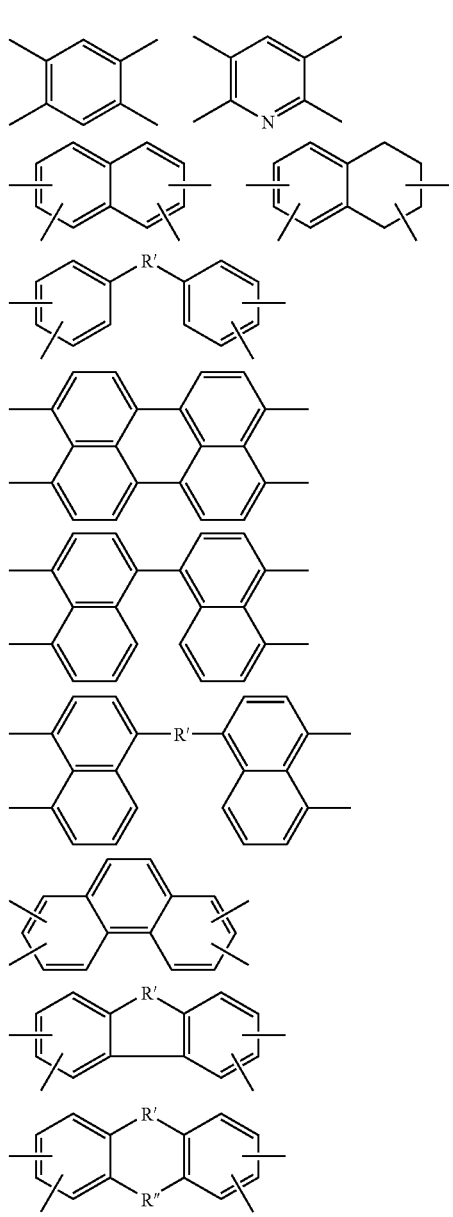

or mixtures thereof.

—R'— is

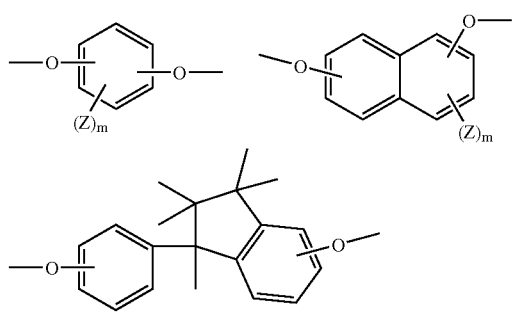

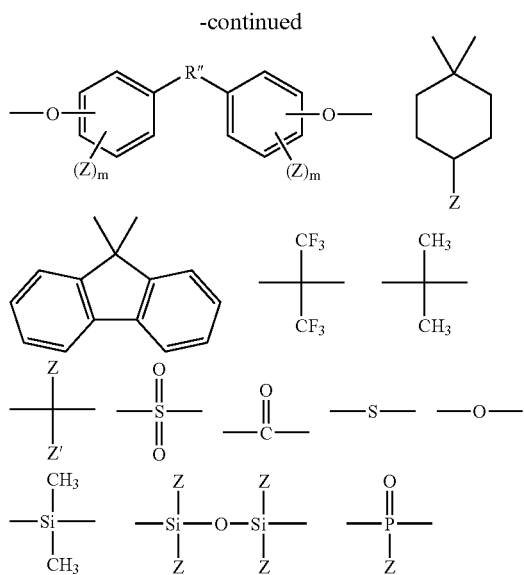

where m equals 0 to 4.

—R″— is

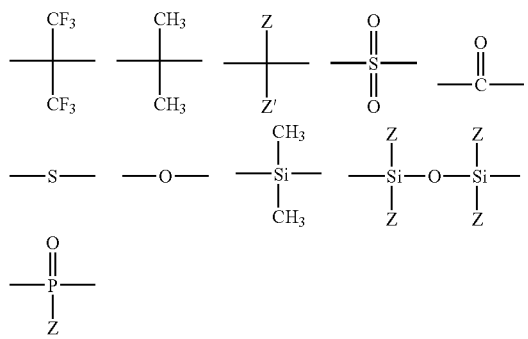

Z and Z′ are:
—H, —CH$_3$, —CH$_2$CH$_3$, —CH$_2$CH$_2$CH$_3$, iso-propyl, iso-butyl, tert-butyl, —Br, —Cl, —F, —NO$_2$, —CN

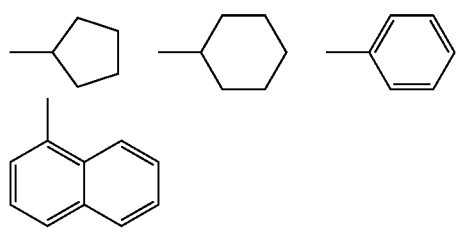

where —Ar$_2$— is independently

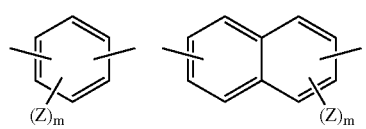

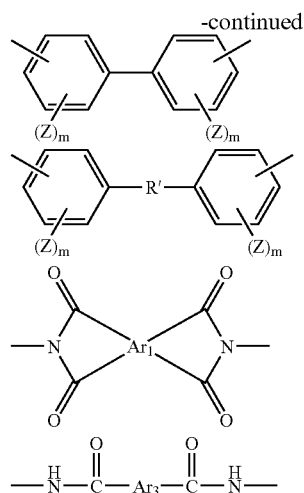

or mixtures thereof, where Ar$_1$ and m are defined as above.

—Ar$_3$— is

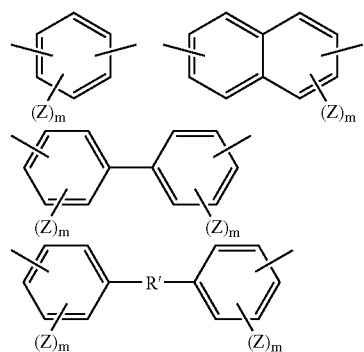

where m is defined as above.

The most preferred polyimides are the poly(ether imide), PEI, of the following formula, manufactured by the General Electric Company under the trade name of Ultem®:

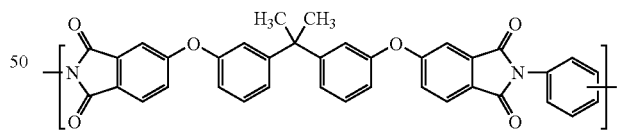

and the phenylindane containing polyimide of the following formula manufacture by the Ciba Geigy Corp. under the trade name of Matrimid®:

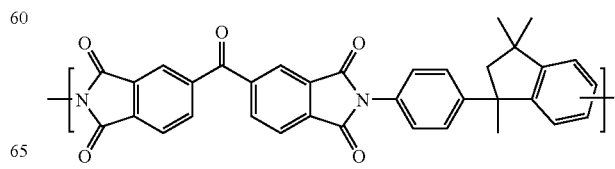

Additional preferred polyimide is the aromatic polyimide which is the polymide formed from the reaction of benzophenone tetracarboxylic dianhydride (BTDA) and optionally pyromellitic dianhydride (PMDA), with toluene diisocyanate (TDI) and/or 4,4'-nethylene-bisphenylisocyanate (MDI). One example of such polymide is the polyimide manufactured by the Lenzing Corporation under the trade name of Lenzing® P84 with the following generalized structure:

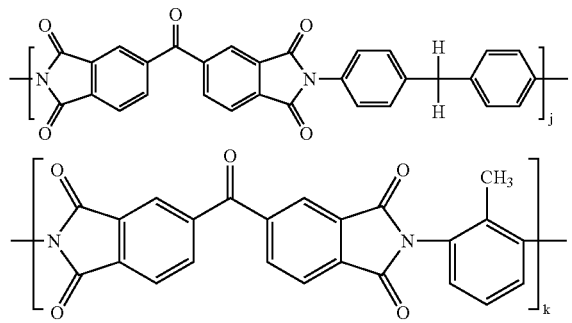

j+k=1.

The polyimides can be used as a single additive component or as a mixture of polyimides. The polyimides typically have a weight average molecular weight in the range of 500 to 1,000,000 Daltons, preferably between 1,000 to 500,000 Daltons.

The formation of the poly(aryl ether) blend with the polyimide can be carried out by mixing components in a molten stage, such as by melt compounding, and other methods conventionally employed in the polymer compounding industry. A plasticizer can be optionally added to aid the mixing process.

The formation of the poly(aryl ether) polyimide blends can be also carried out by a solution process. If a solution process is employed, the component polymers can be dissolved in a suitable solvent, such as chloroform, N,N'-dimethyl formamide (DMF), N-methyl-pyrrolidinone (NMP), tetramethylene sulfone, and the like.

The thus formed poly(aryl ether)/polyimide blends form compatible blend compositions. The compatible composition is defined as capable of forming porous poly(aryl ether) articles with inter—connected pore structure and an average pore diameter of a micrometer or less. Preferred compatible blends are alloys.

Blends suitable for use in preparing porous articles in accordance with this invention preferably comprise from about 5 to about 95 weight percent of the poly(aryl ether) polymer component and from 95 to 5 weight percent of one or more polyimide component, preferably from about 20 to about 80 weight percent of the poly(aryl ether) component.

The blends may contain various additives in addition to the compatible polyimide component, including solvents, stabilizers, flame retardants, pigments, fillers, such as catalytic particles, plasticizers, and the like. Other polymers may be also present in the blend to provide a desired additive property.

The poly(aryl ether)/polyimide precursor blends can be fabricated into a flat sheet film, a fiber, a hollow fiber or other desired shape article by a melt extrusion, a casting or a molding process. The article configuration will depend on the intended use. The article can be optionally annealed at a temperature between 150 to 350° C., preferably between 150 to 300° C. to adjust for the compatibility between the poly(aryl ether) and the polyimide and hence the pore size and the pore size distribution in the final porous material.

It is also within the scope of the present invention to form the porous poly(aryl ether) articles and in particular porous poly(aryl ether) membranes by solution based processes. The porous poly(aryl ether) membranes may be formed by casting a flat sheet or a hollow fiber from a solution containing the poly(aryl ether)/polyimide blend, followed by a complete or partial evaporation of the solvent, which in turn is followed the chemical decomposition and removal of the polyimide phase. In an alternative process, the solution containing the poly(aryl ether) and the polyimide is shaped into a nascent flat sheet or hollow fiber configuration and solidified via a coagulation process by contacting the nascent flat sheet or hollow fiber with a non solvent or by a thermally induced quenching. The solidification step can be preceded by the partial solvent evaporation step. Both asymmetric and symmetric porous membranes can be produced by these solution based casting processes. The asymmetric membranes comprised of a graded density pore structure and symmetric porous membrane are prepared by the following general solution based process:

a. a casting solution is formed containing a poly(ary ether) polymer, a polyimide and at least one solvent,
b. the casting solution is shaped into a membrane configuration such as a flat sheet, a tube or a hollow fiber,
c. the membrane configuration is conveyed through an evaporation zone,
d. the membrane configuration is solidified by contacting the shaped configuration with a coagulation fluid or by a thermally induced quenching,
e. the polyimide phase in the precursor membrane is decomposed into low molecular weight fragments by chemical means,
f. the low molecular weight fragments are removed to form the porous poly(aryl ether) membrane.

It is well known in the art that the atmosphere of the evaporation zone and the duration of the evaporation step c) affects membrane structure. In some embodiments of this invention, the evaporation step c) is omitted to form a largely symmetric porous membrane. As discussed above, it is also within the scope of this invention to omit step d) and to partially or completely remove the solvent by passing the shaped membrane configuration through the evaporation zone in step c).

It is also within the scope of this invention to combine steps d) and e) or steps e) and f) into a single step. This can be accomplished by utilizing a non-solvent system for solidification of the nascent membrane that contains a reagent that can decompose the polyimide into low molecular weight fragments.

The casting solution may be comprised of one or more solvents that substantially dissolve the poly(aryl ether) and polyimide components. The casting solution can further contain non-solvents, poroformers and other additives that promote formation of the porous structure.

The decomposition of the polyimide component of the blend can be effectively carried out by reagents that decompose the polyimide into low molecular weight easily extractable fragments. It was found surprisingly that the hazardous hydrazine compound can be effectively substituted by a number of amine based non-hazardous reagents and/or nitrogen containing organic bases that quantitatively remove the polyimide phase of the blend (i.e., remove substantially all—on the order of about 95% or greater—of the polyimide phase of the blend). These reagents include but are not limited to ammonia, tetraalkylammonium hydroxide, a primary aliphatic amine, or a secondary aliphatic amine. In some embodiments, the reagent that affects polyimide decomposition is diluted with a solvent. Examples of preferred solvents include alcohols, ketones, hydrocarbons, water, and the like. These solvents can facilitate the removal of the low molecular weight fragments and thus provide for the integration of the polyimide decomposition and low molecular weight fragment removal steps. The preferred primary and secondary amine reagents used to decompose the polyimide phase in accordance with this invention include, but are not limited to methylamine, ethylamine, propylamine, butylamine, ethylenediamine, propylenediamine, butylenediamine, morpholine, piperazine, monoethanolamine, ethylethanolamine, diethanolamine, propanolamine, dipropanolamine, and mixtures thereof. Commercially available amine mixtures, such as Ucarsol®, can be also employed. The preferred reagents include primary amines, and tetramethylammonium hydroxide, and their mixtures with alcohols, such as methanol, ethanol, isopropanol, or butanol, ketones, and water. The most preferred reagents for the decomposition of the polyimide phase are the monoethanolamine and the tetramethylammonium hydroxide. It was found surprisingly that the monoethanolamine solutions and tetramethylammonium hydroxide and its mixtures with alcohols and water are particularly effective in decomposing and rapidly removing the polyimide phase. The decomposition and the removal of the polyimide component can be carried out at an ambient temperature or at elevated temperatures to facilitate the decomposition process and the removal of decomposition products. The polyimide decomposition can be carried out in a broad range of temperatures from the room temperature to about 150° C., or even higher. Preferably the polyimide decomposition process and the removal of the low molecular weight decomposition products is carried out concurrently in a common solvent media. In one embodiment of this invention, the polyimide decomposition and removal process is carried out at between 20° C. and 150° C., preferably between 40 and 100° C. The time required to fully decompose the polyimide and to remove products of the decomposition process from the article will depend on the shape and the thickness of the article and on process conditions, such as reagent concentration, agitation rate, temperature and the like, as will be recognized by those skilled in the art. The porous poly(aryl ether) articles are then washed with an alcohol, water, or other suitable solvent, dried and fabricated into a device.

In some embodiments, it is desirable to perform the final drying step from a low surface tension solvent, such as a hydrocarbon, or a fluorocarbon. It is known in the art that drying a porous article from such low surface tension solvent can preserve the porous structure. Preferred hydrocarbons include pentane, hexane, cyclohexane, heptane, octane, and mixtures thereof. Preferred fluorocarbon solvents include chlorofluorocarbons, for example, Freon 113® chloroflurocarbon, and perfluorocarbons, for example, Fluorinert 75®. The porous articles can be dried in air or in an inert gas such as nitrogen. Drying may be also carried out under vacuum. The articles may be dried at temperatures at which drying takes place at a reasonable rate and which do not aversely affect the porous structure. The drying temperatures can be between about 20° C. and about 180° C., preferably between 40° C. and 100° C. The drying time can be as short as about 10 seconds in a continuous drying operation and as long as 24 hours or longer in an enclosed oven.

In some embodiments of this invention, it is desirable to draw the poly(aryl ether) article to affect the shape and the size of pores and to improve mechanic properties. The membrane articles are drawn to improve permeability, separation efficiency or mechanical properties. The drawing may be performed on the poly(aryl ether)/polyimide blend precursor prior to the removal of the polyimide phase or on the porous poly(aryl ether) article after the polyimide phase has been decomposed and removed, or both. Furthermore, the drawing step can be carried out prior to or after the drying step. In some embodiments, the porous structure can be impregnated with a liquid processing aid, such as glycerin, prior to drawing. The articles are drawn by stretching the films, the fiber, or the hollow fiber under tension. Conventional equipment, such as godets, are utilized to draw the articles. The articles are drawn to a ratio of between 1.1 to about 10 or more. The draw ratio is defined as the ratio of the final length after drawing to the original length before drawing:

$L_f/L_i$, where $L_f$ is the final length after drawing and $L_i$ is the initial length before drawing.

The preferred drawing temperature is dependent upon whether the article contains plasticizers or other processing aids at the time of drawing. For poly(aryl ether)/polyimide blend precursor article, it can further depend on the molecular weight of the polyimide and its concentration, as will be recognized by those skilled in the art. For articles substantially free of plasticizers, the drawing temperature is typically above the glass transition temperature of the poly(aryl ether) polymer. The drawing temperature is frequently between 190° C. and 350° C., preferably between 150° C. to about 0.300° C. For articles that contain plasticizers, the drawing temperature may be substantially lower and will depend on the nature and the concentration of the plasticizer as will be recognized by those skilled in the art.

The line speeds for conducting the drawing step may vary significantly. Preferred line speeds range from about 1 meter per minute to about 200 meters per minute, particularly preferred line speeds range from 5 meter per minute to 50 meter per minute.

In some embodiments of this invention, it is advantageous to form the porous poly(aryl ether)s as multilayer articles wherein at least one layer exhibits a uniform and narrow pore size distribution. Such multilayer articles are particularly useful as fluid separation membranes and can provide improved fluxes while maintaining superior separation characteristics. The porous multilayer articles of this invention are preferably comprised of at least two layers and are obtained from multilayer poly(aryl ether)/polyimide blend precursor articles. Each "layer" as referred to herein can be comprised of a different poly(aryl ether) polymer or of the same poly(aryl ether) but will exhibit a difference in the average pore size and/or pore volume. The multilayer poly (aryl ether)/polyimide blends can be formed by a solution casting or by a co-extrusion process. Each layer can be formed from a poly(aryl ether)/polyimide blend that differs in the blend chemical composition. The blends may contain different poly(aryl ether) polymers or different polyimide components or will differ in poly(aryl ether)/polyimide polymer component ratio. Furthermore, each layer can be formed from compositions that contain different amounts of solvents, plasticizers or other additives.

The multilayer poly(aryl ether) article can be in the form of a flat sheet, a tube or a hollow fiber and will contain two or more contiguous layers that differ in the average pore size and/or pore volume. Further more, the thickness of an individual layer can vary from about 1% or less of the overall article thickness to about 99% of the overall article thickness, typically from 10 to 90 percent of the article thickness. The layer comprised of the smaller average size pores can be from 1 micrometer thick or less to about 150 micrometers thick or more and is supported by or sandwiched between layers with a substantially larger average pore size.

The porous articles of this invention may be in the form of a flat sheet film, a fiber, a tube, a hollow fiber, or any other desirable shape. The porous articles can be used in a number of applications, for example, as an adsorption media, as a separator in a device, such as a battery separator, or as a fluid separation membrane. The membrane articles may be in the form of a flat sheet, in a tubular form, or a hollow fiber configuration. In the case of hollow fibers, the fiber preferably possesses an outside diameter from about 50 to about 5,000 micrometers, more preferably from about 80 to about 1,000 micrometers, with a wall thickness from about 10 to about 1,000 micrometers, preferably from 20 to 500 micrometers. In the case of flat sheets, such as porous films, the film preferably possesses a thickness of from about 10 to about 1,000 micrometers, most preferably from about 25 to about 500 micrometers. The flat sheet membranes may be optionally supported by a permeable cloth or a screen.

The porous poly(aryl ether) membranes of this invention can be used directly for a number of fluid separation processes, such as microfiltration, ultrafiltration, nanofiltration and gas separation. The porous poly(aryl ether)s may be further used as substrates in preparation of composite fluid separation membranes. Such composite membranes comprise a porous or a nonporous separation layer superimposed or formed directly on the porous poly(aryl ether) substrate. The separation layer may be formed by a direct casting process, by an interfacial polymerization process or other processes well known in the art.

The following examples will serve to illustrate the utility of this invention but should not be construed as limiting.

EXAMPLE 1

Preparation of Multilayer Porous Polysulfone Film

A two layer porous polysulfone film was prepared by the following procedure:

First, a layer of polysulfone (Udel® 3500)/polyimide (Matrimid®) blend film was form on a glass plate with a rim by the solution casting followed by the solvent evaporation at room temperature. The casting solution contained 0.6 g of polysulfone and 1.4 g of polyimide dissolved in 30 mL of chloroform. The polysulfone/polyimide weight ratio in the film was 30/70. After the solvent in the first layer has been evaporated, a second casting solution contained 0.25 g of polysulfone and 0.25 g of polyimide dissolved in 15 mL of chloroform (50/50 PSF/PI ratio) was cast on top of the first layer followed by solvent evaporation at room temperature. A transparent film with two distinct polymer blend layers was obtained. The thus formed multilayer film was then dried under vacuum at 100° C. for 48 hours. The thickness of the multilayer film was 86 micrometers.

The transparent yellowish multilayer polysulfone/polyimide blend film (15 cm in diameter) was placed into an ethanol bath containing 300 mL of ethanol and 7 mL of hydrazine monohydrate set at 50° C. After 5 hours, the polyimide in the multilayer blend film was substantially decomposed and small molecular weight fragments were extracted. A yellowish solution was decanted and 300 mL of fresh ethanol containing 5 mL of hydrazine was added and the treatment continued for 2 hours. An opaque, white multilayer porous polysulfone film was thus obtained, the film was washed with a large excess of methanol and dried under vacuum at room temperature to a constant weight. The SEM photomicrographs of this multilayer porous film are shown in FIGS. 1 through 5. The porous film is comprised of two distinct porous layers. Both layers exhibit uniform pore size distribution. The average pore diameter in the first bottom layer is about 0.5 micrometer and the average pore diameter in the second top layer is 0.2 micrometers.

EXAMPLE 2

This example demonstrates the use of tetramethylammonium hydroxide as a preferred reagent for the preparation of porous articles of this invention.

Figure 6:
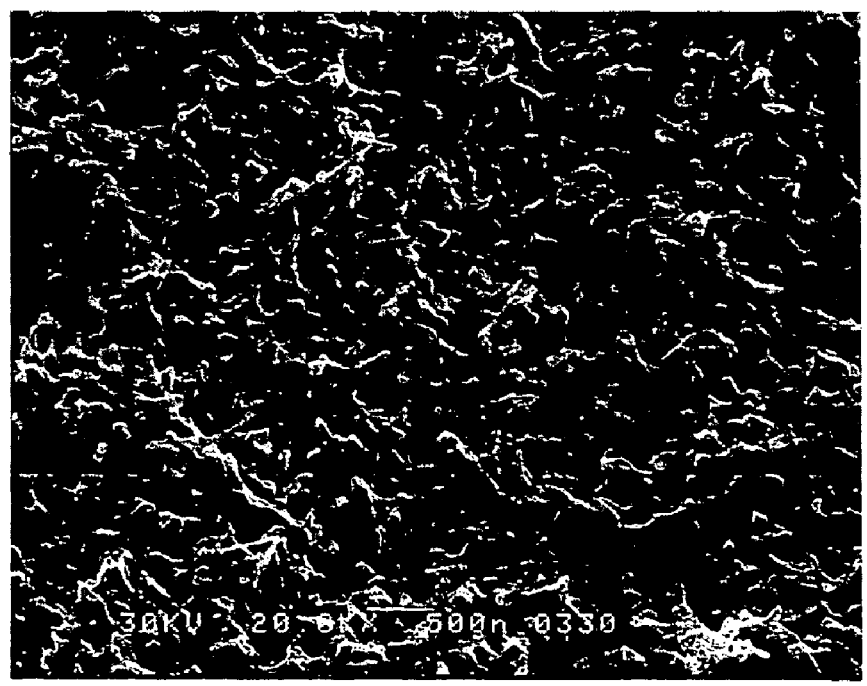
FIG. 6 is a Scanning Electron Microscopy photomicrograph of the cross-section of the porous polysulfone article of present invention at a magnification of 20,000×prepared from the polysulfone/polyimide blend 50/50 by weight utilizing the tetramethylammonium hydroxide solution in methanol (25% by weight) as the polyimide phase decomposition reagent.

70 μm thick polysulfone (Udel® 3500)/polyimide (Matrimid®) (50/50 by weight) blend film about 15 cm in diameter, was formed by a solution casting from 15% chloroform solution followed by drying to a constant weight in a vacuum oven at 100° C. The thus formed polysulfone/polyimide blend film was soaked for 7 hours in 70 mL of tetramethylammonium hydroxide solution in methanol (25% by weight) maintained at 50° C. The transparent film turned opaque and the colorless solution turned yellowish in color. The thus formed porous film was then washed with a large excess of methanol and air-dried. The porous film was further dried under vacuum at 50° C. to a constant weight. The SEM photomicrograph of the cross section of this porous film is shown in FIG. 6. The film exhibits a uniform pore size distribution with an average pore diameter of 0.2 micrometers.

EXAMPLE 3

This example demonstrates the use monoethanolamine as a preferred reagent for the preparation of porous articles of this invention.

Figure 7:
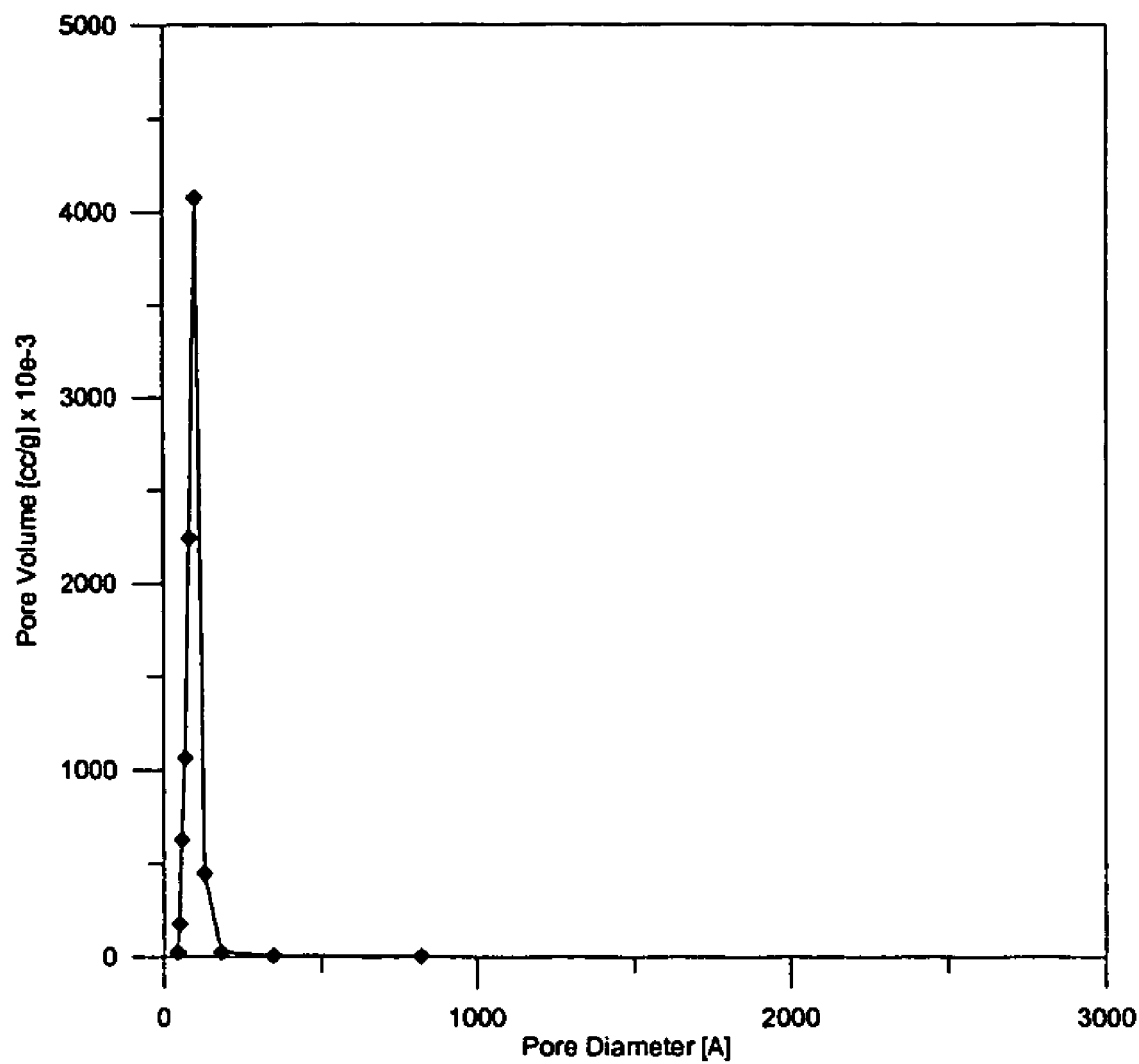
FIG. 7 shows the pore size distribution of the porous polyether sulfone film of present invention prepared from the polyether sulfone/Matrimid® blend (50/50 by weight), as measured by the nitrogen sorption/desorption BET technique.

70 μm thick polyether sulfone (Ultrason®)/polyimide (Matrimid®) (50/50 by weight) blend film about 15 cm in diameter was formed by solution casting from 15% NMP solution followed by drying to a constant weight in a vacuum oven at 150° C. The thus formed film was soaked for 24 hours in 70 mL of monoethanolamine solution in isopropanol (50% by weight) maintained at 50° C. The yellowish transparent film turned into a colorless transparent film. The thus formed porous film was then washed with a large excess of methanol and air-dried. The film was further dried under vacuum at 50° C. to a constant weight. The film was found to exhibit a very narrow pore size distribution with an average pore diameter of 12 nm as measured by the nitrogen BET technique (FIG. 7).

Although the invention has been described with reference to a particular arrangement of parts, features and the like, these are not intended to exhaust all possible arrangements or features, and indeed many other modifications and variations will be ascertainable to those of skill in the art.

What is claimed is:

1. A process for the preparation of a porous poly(aryl ether) article comprising:
   a. forming a blend of poly(aryl ether) polymer with a polyimide,
   b. forming a shaped configuration from said poly(aryl ether) polyimide blend,
   c. decomposing said polyimide in said shaped configuration into low molecular weight fragments by reacting said polyimide with a primary amine, a secondary amine or a tetramethylammonium hydroxide, and d. removing said low molecular weight fragments from said shaped configuration.

2. The process of claim 1 wherein said step b) is accomplished by extrusion, casting or molding.

3. The process of claim 1 wherein said primary aliphatic amine is monoethanolamine, ethylamine, propylamine, butylamine, or a mixture thereof.

4. The process of claim 1 wherein said primary aliphatic amine, secondary amine or tetramethylammonium hydroxide are in a solution of alcohol, hydrocarbon, ketone, water, or a mixture thereof.

5. The process of claim 4 wherein said alcohol is methanol, ethanol, isopropanol, or butanol.

6. The process of claim 1 wherein said poly(aryl ether) is polyphenylene oxide, or polysulfone.

7. The process of claim 6 wherein said polysulfone is polyether sulfone, bisphenol A based polysulfone, or biphenol based polysulfone.

8. The process of claim 6 wherein said polyimide is poly(ether imide) of the following repeat unit:

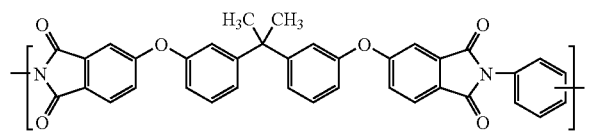

or phenylindane containing polyimide of the following repeat unit:

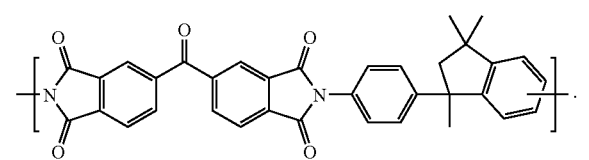

9. The process of claim 1 wherein said shaped configuration is drawn prior to step c) after step d) or both.

10. The process of claim 6 wherein said polysulfone is polyether sulfone and wherein said polyimide is phenylindane containing polyimide.

11. The process of claim 1 wherein said porous article is a flat sheet, a tubular or a hollow fiber fluid separation membrane.

12. The process of claim 11 wherein said membrane is microfiltration, ultrafiltration, nanofiltration or gas separation membrane.

13. The process of claim 11 wherein said fluid separation membrane further contains a separation layer formed on top of the flat sheet, tube or hollow fiber surface.

14. The process of claim 1 wherein said steps c) and d) take place concurrently in a common liquid media.

15. The process of claim 1 further comprising drying the porous article under conditions that substantially preserves the porous structure.

16. The process of claim 15 wherein said drying process is carried out by removing a hydrocarbon, or a fluorocarbon solvent from said porous article.

17. The process of claim 1 wherein said blend contains at least one additive.

18. The process of claim 17 wherein said additive is a solvent, a plasticizer, a catalytic particle, or a filler.

19. The process of claim 1 wherein said poly(aryl ether) article is a multilayer article formed from two or more poly(aryl ether)/polyimide blends that differ in blend chemical composition.

20. The process of claim 19 wherein said multilayer article contains two or more layers that differ in the average pore size.

21. The process of claim 20 wherein the layer comprised of the smaller average pore size is supported or sandwiched between layers with the larger average pore size.

22. The process of claim 1 wherein said article is a battery separator.

23. A process for the preparation of a porous poly(aryl ether) article comprising:

a. forming a casting solution containing a poly(aryl ether), a polyimide and at least one solvent, b. forming a shaped configuration in the form of a flat sheet, a tube, or a hollow fiber from said casting solution, c. conveying said shaped configuration through an evaporation zone, d. solidifying said shaped configuration by contacting it with a coagulation fluid or by a thermally induced quenching, e. decomposing said polyimide in said shaped configuration into low molecular weight fragments by chemical means, wherein said polyimide is decomposed by contacting the shaped configuration with tetramethylammonium hydroxide, primary aliphatic amine, secondary aliphatic amine, or a mixture thereof, f. removing said low molecular weight fragments from said shaped configuration.

24. The process of claim 23 wherein said poly(aryl ether) is polysulfone or poly(phenylene oxide).

25. The process of claim 23 wherein said at least one solvent is partially or completely removed during step c).

26. The process of claim 23 further comprising drying said shaped configuration, to remove residual solvent under conditions that substantially preserve the porous structure.

27. The process of claim 23 wherein said casting solution further contains a non solvent, a poroformer or a filler.

28. The process of claim 23 wherein said step d) and step e) take place concurrently in a common liquid media.

29. The process of claim 23 wherein said step e) and step f) take place concurrently in a common liquid media.

30. The process of claim 23 further comprise a washing step to remove said solvent after step d) and before step e).

31. The process of claim 23 wherein and said primary aliphatic amine is monoethanolamine, ethylamine, propylamine, butylamine, or a mixture thereof.

32. The process of claim 23 wherein said porous article is a microfiltration, an ultrafiltration, a nanofiltration, or a gas separation membrane.

33. The process of claim 32 wherein said microfiltration, ultrafiltration, nanofiltration or gas separation membrane further contain a separation layer formed on top of the flat sheet, tube or hollow fiber surface.

34. The process of claim 23 wherein said porous article is a multilayer article formed from two or more casting solutions that differ in solution chemical composition.

35. The process of claim 34 wherein said multilayer article contains two or more layers that differ in the average pore size.

36. The process of claim 35 wherein the layer comprised of the smaller average pore size is supported by or sandwiched between layers with the larger average pore size.

37. The process of claim 24 wherein said polysulfone is polyether sulfone and said polyimide is phenylindane containing polyimide of the following formula:

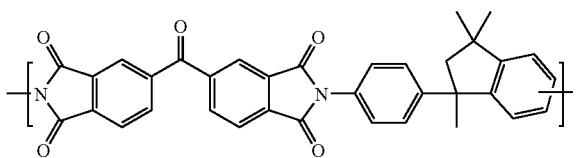

or poly(ether imide) of the following general formula:

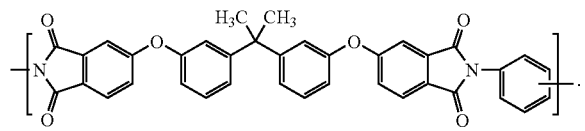

38. The process of claim 24 wherein said polysulfone is bisphenol A based polysulfone and said polyimide is phenylindane containing polyimide of the following general formula:

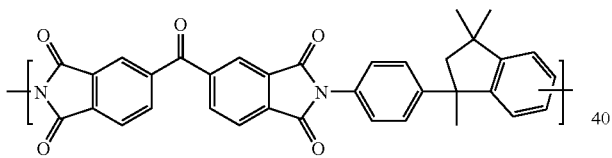

or poly(ether imide) of the following general formula:

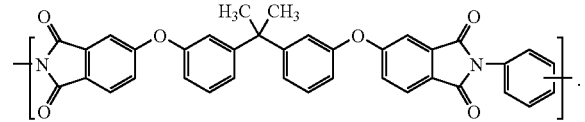

39. The process of claim 23 wherein said poly(aryl ether) is poly(phenylene oxide) and said polyimide is phenylindane containing polyimide of the following general formula:

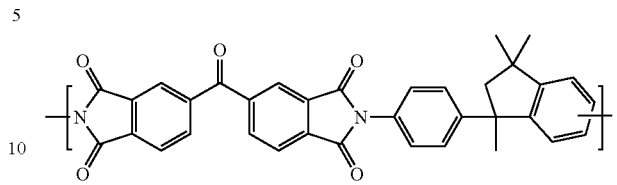

or poly(ether imide) of the following general formula:

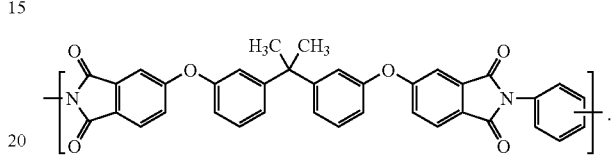

40. The process of claim 24 wherein said polysulfone is biphenol based polysulfone.

41. The process of claim 24 wherein said flat sheet is supported by a screen or a permeable cloth.

42. A process for the preparation of a porous multilayer poly(aryl ether) article comprising:
   a. forming a first blend of poly(aryl ether) polymer with a polyimide;
   b. forming at least one additional blend of a poly(aryl ether) polymer with a polyimide wherein the blend composition differs from that of said first blend;
   c. forming a shaped article of two or more layers from said poly(aryl ether) polyimide blends by extrusion, casting or molding;
   d. decomposing said polyimide in said shaped article into low molecular weight fragments by chemical means, wherein said polyimide is decomposed by contacting the shaped configuration with tetramethylammonium hydroxide, primary aliphatic amine, secondary aliphatic amine, or a mixture thereof; and
   e. removing said low molecular weight fragments from said article.

43. The process of claim 42 wherein said poly(aryl ether) in said first blend or said at least one additional blend is polyphenylene oxide, or polysulfone.

* * * * *